(12) United States Patent
Watanabe

(10) Patent No.: US 9,574,490 B2
(45) Date of Patent: Feb. 21, 2017

(54) INTERSTAGE GAS INJECTION FOR MULTI-STAGE TURBOCHARGED NATURAL GAS ENGINE

(71) Applicant: Cummins Inc., Columbus, IN (US)

(72) Inventor: Atsuhiko Watanabe, Columbus, IN (US)

(73) Assignee: Cummins Inc., Columbus, IN (US)

( * ) Notice: Subject to any disclaimer, the term of this patent is extended or adjusted under 35 U.S.C. 154(b) by 225 days.

(21) Appl. No.: 13/948,239

(22) Filed: Jul. 23, 2013

(65) Prior Publication Data

US 2015/0027115 A1  Jan. 29, 2015

(51) Int. Cl.
| | |
|---|---|
| *F02D 23/00* | (2006.01) |
| *F02B 37/013* | (2006.01) |
| *F02B 37/18* | (2006.01) |
| *F02B 29/04* | (2006.01) |
| *F02M 21/02* | (2006.01) |

(52) U.S. Cl.
CPC ......... *F02B 37/013* (2013.01); *F02B 29/0412* (2013.01); *F02B 37/18* (2013.01); *F02M 21/0206* (2013.01); *F02M 21/0212* (2013.01); *Y02T 10/144* (2013.01); *Y02T 10/146* (2013.01); *Y02T 10/32* (2013.01)

(58) Field of Classification Search
CPC ... F02B 37/004; F02B 37/013; F02B 29/0412; F02B 37/18; F02B 37/007; F02B 37/24; F02B 37/10; F02B 39/10; F02M 21/0206; F02M 21/0212; F02D 41/0007
USPC ...... 60/612, 611, 605.1, 600, 601, 602, 619; 123/562
See application file for complete search history.

(56) References Cited

U.S. PATENT DOCUMENTS

| | | | | |
|---|---|---|---|---|
| 2,092,565 | A | * | 9/1937 | Waseige ............. F02M 1/00 123/562 |
| 2,500,234 | A | * | 3/1950 | Bates ............... F02B 37/16 60/600 |
| 4,231,225 | A | | 11/1980 | Aya |
| 4,638,634 | A | * | 1/1987 | McLean ............ F02B 37/005 417/380 |
| 4,753,076 | A | * | 6/1988 | Deutschmann ..... F02B 37/007 60/612 |
| 5,069,194 | A | * | 12/1991 | Deutschmann ..... F02B 37/18 123/562 |
| 5,329,757 | A | | 7/1994 | Faulkner et al. |

(Continued)

FOREIGN PATENT DOCUMENTS

| | | |
|---|---|---|
| EP | 0 953 102 B1 | 9/2003 |
| EP | 1 191 202 B1 | 4/2005 |

(Continued)

OTHER PUBLICATIONS

PCT/US2014/047545, International Search Report and Written Opinion, Oct. 21, 2014, 11 pages.

*Primary Examiner* — Patrick Maines
(74) *Attorney, Agent, or Firm* — Taft Stettinius & Hollister LLP

(57) ABSTRACT

A turbocharged internal combustion engine system includes at least one high pressure turbocharger and at least one low pressure turbocharger arranged in series. A fuel source that provides fuel for gaseous fuel induction operation of the engine is connected to inject fuel between the low pressure compressor of the low pressure turbocharger and the high pressure compressor of the high pressure turbocharger.

21 Claims, 3 Drawing Sheets

(56) References Cited

U.S. PATENT DOCUMENTS

| | | | | |
|---|---|---|---|---|
| 5,483,943 | A | * | 1/1996 | Peters ................ F02M 21/0239 |
| | | | | 123/527 |
| 5,557,919 | A | | 9/1996 | Althaus |
| 5,823,446 | A | * | 10/1998 | Bennett .............. F02M 51/0667 |
| | | | | 239/585.1 |
| 6,418,723 | B1 | * | 7/2002 | Gladden ............... F02B 37/013 |
| | | | | 415/120 |
| 7,107,972 | B1 | | 9/2006 | Jones et al. |
| 8,011,186 | B2 | | 9/2011 | McEwan et al. |
| 2008/0121218 | A1 | * | 5/2008 | Algrain ................ F02B 37/013 |
| | | | | 123/565 |
| 2009/0000275 | A1 | * | 1/2009 | Zielke ................... F01N 3/0231 |
| | | | | 60/278 |
| 2010/0083656 | A1 | | 4/2010 | Parlow et al. |
| 2011/0095541 | A1 | | 4/2011 | Baeuerle |
| 2011/0253112 | A1 | * | 10/2011 | Guggenberger ...... F02B 37/013 |
| | | | | 123/562 |
| 2014/0260239 | A1 | | 9/2014 | Genter |

FOREIGN PATENT DOCUMENTS

| | | | |
|---|---|---|---|
| JP | 58185970 A | * | 10/1983 |
| WO | 2006015814 A1 | | 2/2006 |

* cited by examiner ically small high pressure turbocharger and then through the larger turbine of the low pressure turbocharger. The compressors of the two turbochargers are also arranged in series, with intake air flowing first through the relatively large compressor of the low pressure turbocharger and then through the relatively small compressor of the high pressure turbocharger. Compression of the intake flow raises the temperature of the intake flow, which can then be cooled via a heat exchanger to increase the density of the intake flow in the intake manifold. This also reduces undesirable effects of auto-ignition or knock in the combustion chamber.

INTERSTAGE GAS INJECTION FOR MULTI-STAGE TURBOCHARGED NATURAL GAS ENGINE

FIELD OF THE INVENTION

The present invention relates to internal combustion engines with gaseous fuel induction and multi-stage turbocharger systems. Particularly, but not exclusively, the present invention relates to interstage gaseous fuel injection in a multi-stage turbocharger system connected to an internal combustion engine that operates via gaseous fuel induction.

BACKGROUND

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine exhaust manifold. Rotation of the turbine wheel rotates a compressor wheel mounted on the other end of the shaft within a compressor housing. The compressor wheel delivers compressed intake flow to the engine intake manifold to increase power and fuel efficiency over what is possible with a normally aspirated engine.

One known approach to improving turbocharging efficiency and reducing emissions for an engine with a wide speed/load range is to provide a sequential two stage turbocharging system, comprising one relatively small high pressure turbocharger and another relatively large low pressure turbocharger. The turbochargers are arranged in series so that exhaust from the engine flows first through the smaller turbine of the high pressure turbocharger and then through the larger turbine of the low pressure turbocharger. The compressors of the two turbochargers are also arranged in series, with intake air flowing first through the relatively large compressor of the low pressure turbocharger and then through the relatively small compressor of the high pressure turbocharger. Compression of the intake flow raises the temperature of the intake flow, which can then be cooled via a heat exchanger to increase the density of the intake flow in the intake manifold. This also reduces undesirable effects of auto-ignition or knock in the combustion chamber.

One problem with multi-stage turbocharger systems concerns the injection of fuel. When fuel is injected upstream of the first low pressure compressor, extra work is required since the air and fuel mixture, also known as the charge flow, is compressed in each of the compressor stages. When fuel is injected downstream of the last or high pressure compressor, then inadequate mixing of the fuel with the air of the intake flow may result in uneven fuel distribution between combustion chambers of the engine's cylinders. Furthermore, the quality of combustion in the combustion chambers may suffer from lack of homogeneity of the charge flow distributed to the cylinders. Therefore, there remains room for further improvements in this technology area.

SUMMARY

There is disclosed herein an improved internal combustion engine system that includes interstage injection of fuel between compressors of a multi-stage turbocharger system. In some embodiments, the system may include a wastegate around a high pressure turbine of the turbocharger system. The wastegate can be configured and/or controlled to regulate the pressure of the charge flow, which includes the gaseous fuel, to the cylinders and reduce cylinder backpressure under certain operating conditions. In other embodiments, the system may include a bypass that extends from downstream of the outlet of a high pressure compressor to upstream of an inlet of a low pressure compressor of the multi-stage turbocharger system. The bypass can be configured and/or controlled to provide the desired charge flow and fuelling to the cylinders of the engine while returning excess charge flow to the intake system to improve fuel economy without increasing cylinder backpressure Other aspects, embodiments, features and applications of the present invention will be apparent from the following description.

DETAILED DESCRIPTION

Figure 1:
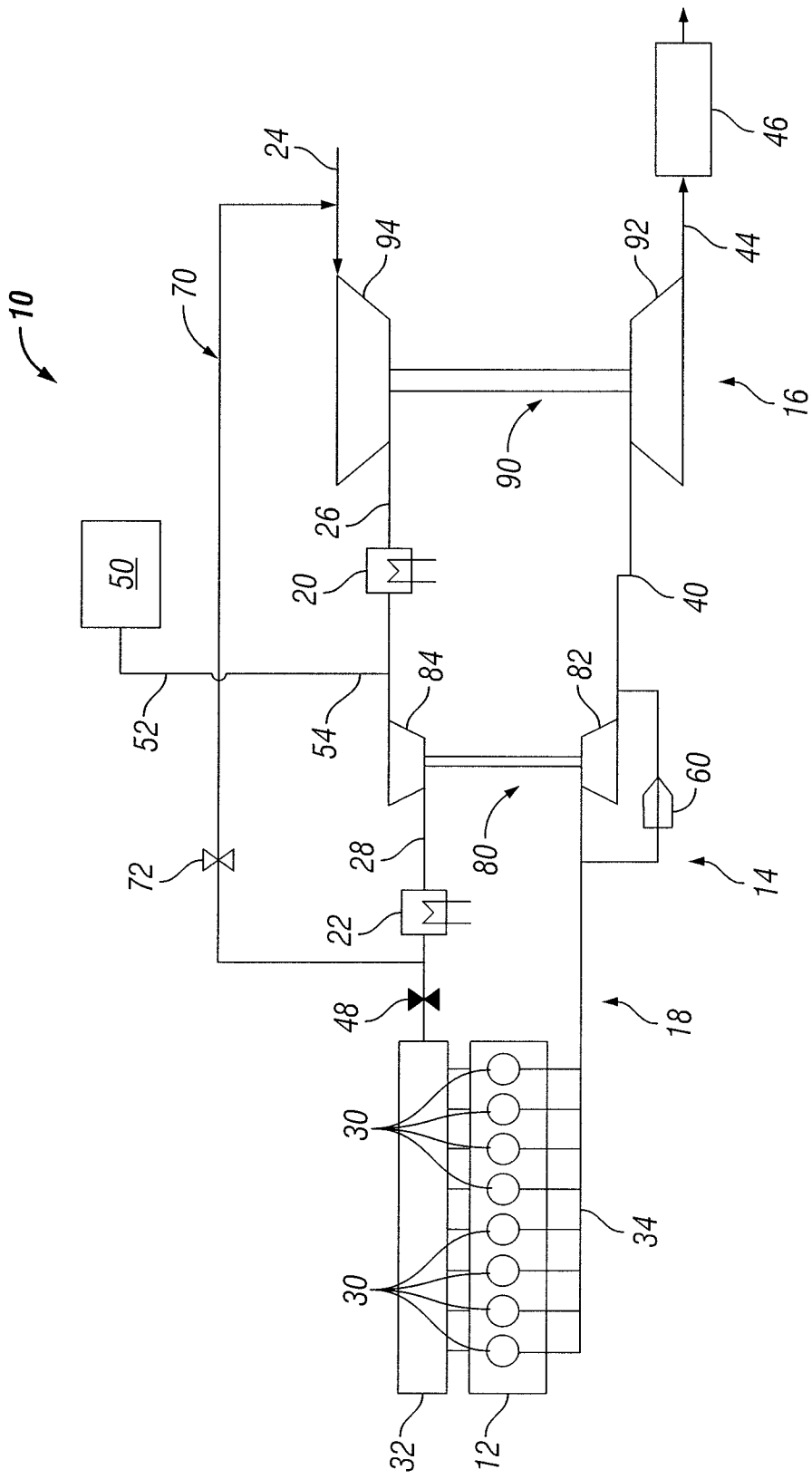
FIG. 1 is a schematic illustration of one embodiment of an internal combustion engine system with a two-stage turbocharger arrangement including interstage fuel injection.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, the schematically illustrated internal combustion engine system 10 comprises an internal combustion engine 12 connected to at least one high pressure turbocharger stage or system 14 and at least one low pressure turbocharger stage or system 16. High pressure turbocharger system 14 includes at least one high pressure turbocharger 80, and low pressure turbocharger system 16 includes at least one low pressure turbocharger 90, which are connected in series to the exhaust system 18 of internal combustion engine 12. The high pressure turbocharger 80 comprises at least one exhaust turbine 82 and at least one compressor 84. The low pressure turbocharger 90 comprises at least one exhaust turbine 92 and at least one large compressor 94.

Engine 12 can be, for example, any suitable engine that operates with gaseous fuel induction from a fuel that is injected into the intake system via an injector 54 at an interstage location between compressors 84, 94. The fuel is injected into the intake air to form a charge flow that is delivered to the combustion chambers of each of the cylinders 30 of engine 12. As used herein, injector 54 includes any suitable device for providing fuel into the intake system. Furthermore, the system 10 may include a vehicle of any type that is propelled by engine 12 including, but not limited to, locomotives, aircraft, trucks, automobiles, tractors, and construction equipment, for example. Systems 10 which utilize a stationary platform are also contemplated, such as a generator set.

The turbocharging systems 14, 16 deliver a compressed charge flow comprising an air and fuel mixture to the engine 12 via an intake system that includes an intercooler 20, an aftercooler 22, high pressure compressor 84, and low pressure compressor 94. As used herein, "air" includes fresh air alone or a mixture of fresh air and another component or components, such as any exhaust gas that may be recirculated for mixing with the fresh air upstream, downstream or at one or both of the compressors 84, 94. Intake passage portion 24 provides intake air to an inlet or low pressure compressor 94. Compressed intake air is outlet from low pressure compressor 94 either directly or via an intake passage portion 26 into an inlet of intercooler 20 that is positioned at the interstage location between compressors 84, 94. The compressed intake air is cooled in intercooler 20 via any suitable heat exchange process, such as an air-to-water or air-to-air heat exchange process, and then outlet to intake passage portion 26. Fuel may be injected either upstream or downstream of intercooler 20. Intercooler 20 between compressors 84, 94 reduces the energy required to compress the charge flow by high pressure compressor 84, improving the fuel economy of engine 12. Intercooler 20 also reduces thermal stress on high pressure compressor 84 and improves its durability. High pressure compressor 84 further compresses and outlets the cooled, compressed charge flow to aftercooler 22 via an intake passage portion 28 or via a direct connection to aftercooler 22. The highly compressed charged flow is cooled further by aftercooler 22 via any suitable heat exchange process, such as an air-to-air or air-to-water heat exchange process, and delivered to an intake manifold portion 32 for combustion by one or more cylinders 30 of engine 12 that are connected to intake manifold portion 32.

After the turbocharged charge flow is combusted in the respective cylinder or cylinder(s) 30 of engine 12, the exhaust gas is outlet into an exhaust manifold portion 34 where it is delivered to the inlet of high pressure turbine 82 to drive high pressure compressor 84 via a rotatable shaft therebetween. The exhaust gas is then outlet from high pressure turbine 82 into a first exhaust passage portion 40 that is connected to an inlet of low pressure turbine 92. Exhaust gas is delivered to low pressure turbine 92 in order to drive low pressure compressor 94 via a rotatable shaft connected therebetween. Exhaust gas leaves low pressure turbine 92 from an exhaust outlet 44. Exhaust outlet 44 can include a conventional aftertreatment system 46 to treat the exhaust gas for emissions prior to being outlet to atmosphere. The after-treatment system 46 may be one of a variety of types of after-treatment systems, including conventional systems generally known to one of ordinary skill in the art. Types of after-treatment systems contemplated include those designed to remove particulates, nitrogen-oxide compounds, and other regulated emissions.

In one embodiment, system 10 further includes a fuel source 50 that is connected to intake passage portion 26 at an interstage location between low pressure compressor 94 and high pressure compressor 84. Fuel source 50 is connected to a fuel line 52 that extends between fuel source 50 and a fuel injector 54. Fuel injector 54 is shown connected to intake passage portion 26 downstream of intercooler 20, but also may be connected upstream of intercooler 20. In any event, the air and fuel mixture forms a charge flow that enters high pressure compressor 84 where the pressure of the charge flow is further increased. The compressed charge flow passes through aftercooler 22 for cooling of the compressed charge flow. A throttle 48 may also be provided in intake passage portion 28 to regulate the charge flow to cylinders 30. Embodiments in which throttle 48 is omitted are also contemplated.

In the illustrated embodiment, a multi-stage compressor bypass 70 is provided that connects intake passage portion 28 downstream of high pressure compressor 84 to intake passage portion 24 upstream of low pressure compressor 94. Compressor bypass 70 may include a control valve 72 to selectively regulate the charge flow through bypass 70. In one embodiment, bypass 70 is used in conjunction with or as an alternative to throttle 48 to control the charge flow to intake manifold portion 32. In embodiments with a bypass 70, control valve 72 can include an actuator connected to a controller, such as an engine control module. The actuator is responsive to control signals from the controller to adjust the charge flow through bypass 70 and thus the amount of fuel supplied to cylinders 30. Accordingly, a portion of the compressed charge flow can be selectively returned to intake passage portion 24 in an amount controlled for specific operating conditions to respond to engine demand and improve fuel efficiency under certain operating conditions.

Compressed charge flow from high pressure compressor 84 is provided to manifold portion 32 for distribution to the plurality of cylinders 30 through respective intake valves associated with the cylinders. Exhaust from cylinders 30 is released into exhaust manifold portion 34, and then to high pressure turbine 82 and low pressure turbine 92 as discussed above. In the illustrated embodiment, a wastegate 60, which may be external or internal to high pressure turbine 82 or both, may be provided around high pressure turbine 82 for enhanced control of exhaust flows and charge flow pressures, and to improve fuel economy under certain operating conditions. Wastegate 60 can operate in conjunction with interstage gas injection from fuel source 50. Embodiments without a wastegate 60 are also contemplated.

In embodiments with a wastegate 60, wastegate 60 can include an actuator connected to a controller, such as an engine control module. The actuator is responsive to control signals from the controller to adjust the exhaust flow through wastegate 60 and thus the amount by which high pressure compressor 84 compresses the charge flow. Accordingly, the work provided by high pressure compressor 84 can be controlled for specific operating conditions to respond to engine demand and improve fuel efficiency under certain operating conditions.

The addition of fuel at the interstage location between compressors 84, 94 reduces the mass flow through low pressure compressor 94 as compared to systems that introduce fuel upstream of low pressure compressor 94, requiring less work from compressor 94 to provide the inlet air at the desired outlet pressure. This also allows for a lower inlet pressure to low pressure compressor 94, reducing the backpressure acting on the pistons in the respective cylinders 30, improving the efficiency of engine 12. Furthermore, interstage fuel injection allows thorough mixing of the fuel with the intake air by high pressure compressor 84, providing a more homogenous charge flow and improved homogeneity in the air and fuel mixture in each of the cylinders 30 and from one cylinder to the next, improving the combustion process. In addition, the fuel can be injected at a lower pressure than would be needed at an injection location that is downstream of the high pressure compressor 84, eliminating the need for an auxiliary fuel compressor, or at least reducing the amount of work required to compress the fuel for injection.

Fuel source 50 can be, for example, a storage tank or a pipeline of gaseous fuel. As a result, gaseous fuel from the fuel source 50 may be able to be injected at pressure, typically on the order of 30-40 psi, at the interstage location discussed above without auxiliary compression, realizing significant savings in eliminating auxiliary fuel compression, and also by eliminating compression of the fuel by low pressure compressor 94 while maintaining the benefits of improved homogeneity and mixing provided by high pressure compressor 84. The fuel in fuel source 50 can be, for example, natural gas, methane, propane, or hydrogen based fuels.

Figure 2:
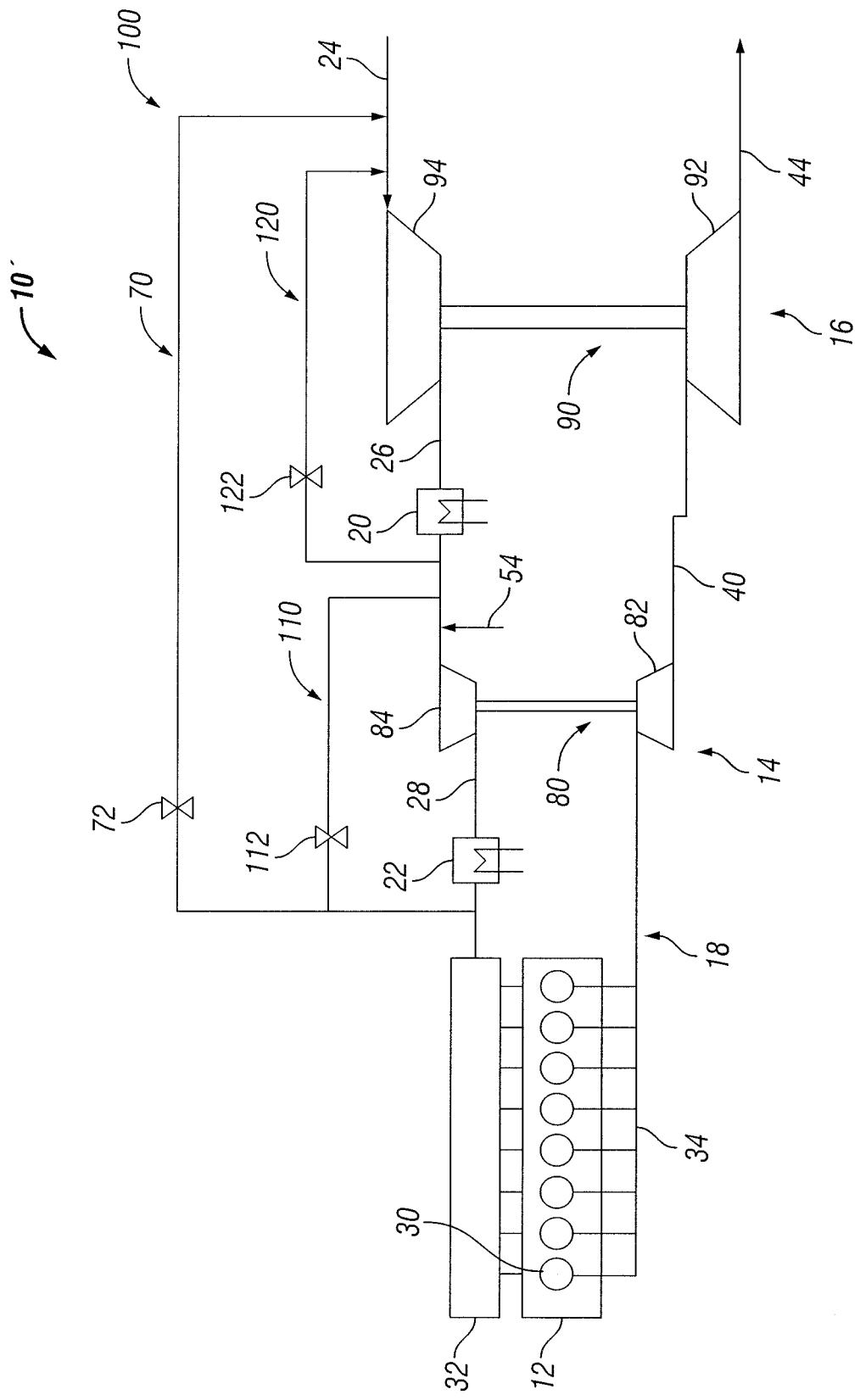
FIG. 2 is a schematic illustration of another embodiment of an internal combustion engine with a two-stage turbocharger arrangement including interstage fuel injection.

Referring now to FIG. 2, there is shown another embodiment of internal combustion engine system 10', which can include features that are the same as system 10 discussed above. Accordingly, like elements are designated with the same reference numerals. System 10' includes a multiple bypass system 100 that, in addition to a multi-stage compressor bypass 70, includes bypasses 110 and 120 that each bypass a single compressor stage. High pressure bypass 110 includes a control valve 112 that regulates charge flow from a location downstream of high pressure compressor 84 to the interstage location along intake passage portion 26 that is between compressors 84, 94. Low pressure bypass 120 includes a control valve 122 that regulates air flow from the interstage location to a location that is upstream of low pressure compressor 94 along intake passage portion 24. In the illustrated embodiment, the inlet to high pressure bypass 110 is downstream of aftercooler 22 and shared with multi-stage bypass 70. In other embodiments, multi-stage bypass 70 includes a separate inlet, or omitted. The inlet to low pressure bypass 120 is downstream of intercooler 20 at an interstage location. Embodiments in which one or both of the inlets is at or upstream of the aftercooler 22 and intercooler 20 are also contemplated.

Each of the control valves 112, 122 can be connected to the controller discussed above and include actuators that receive control signals to regulate the charge flow and inlet air flow, respectively, therethrough in response to engine operating conditions and programming in the controller. The bifurcation of the charge flow and the inlet flow in the respective bypasses 110, 120 allows the work performed by each compressor 84, 94 to be optimized to engine operating conditions, fuel injection pressures, and turbocharger operating conditions. Multi-stage compressor bypass 70 can also be provided to regulate charge flow to the intake passage portion 24 upstream of low pressure compressor 94 in conditions in which interstage diversion of intake air or interstage addition of charge flow is not desired.

Figure 3:
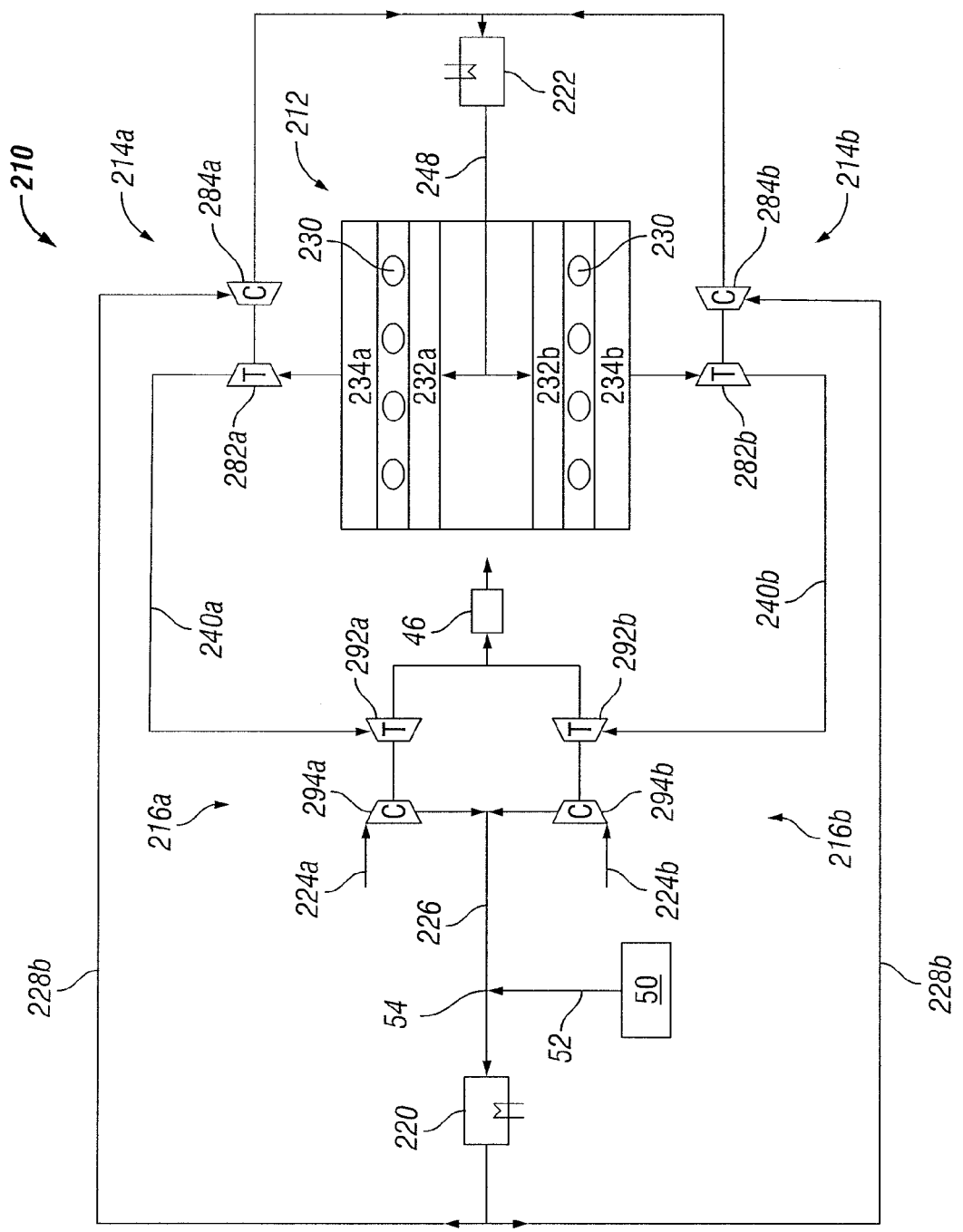
FIG. 3 is a schematic illustration of another embodiment of an internal combustion engine system including a parallel, two-stage turbocharging system with interstage fuel injection.

Referring now to FIG. 3, another embodiment internal combustion engine system 210 is shown that includes two multi-stage turbocharger systems in parallel. System 210 includes an internal combustion engine 212 having a plurality of cylinders 230 and first and second exhaust manifold portions 234a, 234b and first and second intake manifold portions 234a, 234b. In the illustrated embodiment intake manifold portions 232a, 232b and exhaust manifold portions 234a, 234b are on opposite sides of engine 212, but the manifold portions could be located in series relative to one another for an in-line cylinder arrangement such as shown above with respect to engine 12. System 210 also includes fuel source 50 connected with fuel line 52 to injector 54 at an interstage location along intake passage portion 226 of system 210. As discussed further below, the interstage injection location is between high pressure turbocharger systems 214a, 214b and low pressure turbocharger systems 216a, 216b.

High pressure turbocharger system 214a includes a first high pressure turbine 282a connected to receive exhaust from first exhaust manifold portion 234a to operate first high pressure compressor 284a. High pressure turbocharger system 214b includes a second high pressure turbine 282b connected to receive exhaust from second exhaust manifold portion 234b and operate second high pressure compressor 284b. Exhaust from high pressure turbine 282a is conveyed via a first exhaust passage 240a to low pressure turbine 292a to operate a first low pressure compressor 294a of first low pressure turbocharger system 216a. Exhaust from high pressure turbine 282b is conveyed via a second exhaust passage 240b to low pressure turbine 292b to operate a second low pressure compressor 294b of second low pressure turbocharger system 216b. The combined exhaust flows from low pressure turbines 292a, 292b can be outlet through aftertreatment system 46, or outlet through separate aftertreatment systems.

Low pressure compressor 294a receives intake air from intake portion 224a and low pressure compressor 294b receives intake air from intake portion 224b. Intake portions 224a, 224b may branch from a common intake (not shown) or remain separate intakes. Compressed intake air from compressors 294a, 294b combines at common intake passage portion 226. Fuel injector 54 is provided along common intake passage portion 226 so that fuel is added to the combined, compressed intake flows to form a charge flow between the high pressure turbochargers 214a, 214b and low pressure turbochargers 216a, 216b. An intercooler 220 may also be provided in common intake passage portion 226. Alternatively, intercoolers may be provided in intake passage portions 228a, 228b that branch from common intake passage portion 226 to carry charge flow to the inlets of respective ones of the high pressure compressors 284a, 284b. The compressed charge flows from high pressure compressors 284a, 284b combine at charge flow intake passage portion 248 for aftercooling in aftercooler 222. Recombining of the charge flows after high pressure compression provides mixing of the charge flows and more even distribution of the fuel in the charge flow to the cylinders 230 connected to the respective intake manifold portions 232a, 232b.

It will be appreciated that features and modifications that can be made to the turbocharging system of FIGS. 1-3, such as for instance the inclusion of a wastegate around the low pressure turbine(s), and application of the system to an engine including an exhaust gas re-circulation system. Exhaust gas flow control valves can also be provided to modulate the exhaust gas flow to the high pressure and/or low pressure turbochargers in varied operating conditions, and in accordance with various possible control regimes.

Turbines of the turbochargers discussed herein may be of a fixed or variable geometry type. Variable geometry turbines differ from fixed geometry turbines in that the size of the inlet passageway can be varied to optimize gas flow velocities over a range of mass flow rates so that the power output of the turbine can be varied to suite varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway. Turbochargers provided with a variable geometry turbine are referred to as variable geometry turbochargers.

Although two stage turbocharging systems comprising fixed geometry turbines may in some respects provide an alternative to the use of relatively complex and expensive variable geometry turbochargers, the turbochargers of one or both stages of the two stage turbocharging system could be a variable geometry turbocharger (of any type). This may be desirable for instance to further improve control over the turbocharging system and the ability to optimize turbocharging performance across a wide range of engine operating conditions.

In the above described embodiments there is a two-stage turbocharger system and a parallel two stage turbocharger systems. However, it will be appreciated that a parallel two stage turbocharging system according to the present invention could for instance include more than two high pressure turbochargers. For example, the high pressure turbines could receive an exhaust gas flow from a respective proportion of the cylinders from a multi-cylinder engine. In such embodiments, the outlets from the high pressure turbines can flow to a respective low pressure turbine located downstream thereof, or be combined all or in part to one or more low pressure turbines, or the flow from one high pressure turbine may be split between two (or more) low pressure turbines downstream of the high pressure turbine.

Furthermore, it will be appreciated that a turbocharging system could for instance include two parallel high pressure turbines such as shown in FIG. 3. Each of two high pressure turbines could receive an exhaust gas flow from a respective bank of cylinders from a multi-cylinder engine (for instance each receiving exhaust gas from one bank of a "V" configured engine, or from a grouping of cylinders in an in-line configuration). In such embodiments, the outlet from each high pressure turbine can be combined downstream for flow to a single low pressure turbine located downstream of the high pressure turbines, or the flow from a single high pressure turbine may be split between two (or more) low pressure turbines downstream of the high pressure turbine.

In embodiments comprising more than one high pressure turbine, the high pressure turbines can be linked to a common high pressure compressor or to separate respective high pressure compressors. In embodiments comprising more than one low pressure turbine, the low pressure turbines can be linked to a common low pressure compressor or to separate respective low pressure compressors.

In embodiments comprising more than one high pressure compressor, the high pressure compressors can be linked to a common high pressure turbine or to separate respective high pressure turbines. In embodiments comprising more than one low pressure compressor, the low pressure compressors can be linked to a common low pressure turbine or to separate respective low pressure turbines.

Alternatively, rather than providing two separate high pressure turbines to receive exhaust gas flow from two separate banks of engine cylinders, a single twin entry high pressure turbine could be included in a turbocharger system. Moreover, in a turbocharger system comprising one or more high pressure turbines, each of the high pressure turbines could be configured as a twin-entry turbine.

Similarly, it will be appreciated that a turbocharging system could have more than one set of sequentially connected turbochargers operating in parallel. For instance, a first turbocharging system generally as described above could receive an exhaust gas flow from a first set of cylinders of a multi-cylinder combustion engine, and a second sequential turbocharging arrangement as described above could receive exhaust gas from a second set of cylinders of the engine (each "set" could comprise a single cylinder).

It will further be appreciated that the turbocharger systems are not limited to a two stage sequential or serial turbocharging system, but could be embodied in a turbocharging system comprising more than two turbocharger stages connected in series.

A variety of aspects of the systems disclosed herein are contemplated. According to one aspect, an internal combustion engine system includes an internal combustion engine and at least one intake system for delivering a charge flow to at least a portion of a plurality of cylinders of the internal combustion engine and at least one exhaust system for receiving exhaust gas from at least a portion of the plurality of cylinders. The system includes at least one high-pressure turbocharger with a first high pressure turbine in the exhaust system and at least one low pressure turbocharger with a first low pressure turbine in the exhaust system downstream of the first high pressure turbine. The low pressure turbocharger further includes a first low pressure compressor operably connected to the low pressure turbine with the low pressure compressor in the intake system to receive and compress intake air, and the high pressure turbocharger further includes a first high pressure compressor operably connected with the first high pressure turbine with the first high pressure compressor in the intake system downstream of the low pressure compressor. The system also includes a fuel injector connected to the intake system between the low pressure compressor and the high pressure compressor to provide a fuel to the compressed intake air and form the charge flow for compression by the high pressure compressor, and a wastegate connected to the exhaust system around the high pressure turbine.

In one refinement, the system includes an intercooler in the intake system passage between the low pressure compressor and the high pressure compressor for cooling the intake air compressed by the low pressure compressor. In a further refinement, an aftercooler is included in the intake system downstream of the high pressure compressor and upstream of an intake manifold of the internal combustion engine for cooling the charge flow compressed by the high pressure compressor. In another refinement, the system includes a throttle in the intake system between the high pressure compressor and an intake manifold of the internal combustion engine to regulate the charge flow to the plurality of cylinders.

In another refinement, the at least one high pressure turbocharger includes at least two high pressure turbochargers with respective first and second high pressure turbines connected to respective ones of first and second exhaust passages of the exhaust system. In a further refinement, the at least two high pressure turbochargers further include respective first and second high pressure compressors that are connected to respective ones of first and second intake passage portions of the intake system. The first and second intake passage portions connect to one another at a common intake passage portion that is downstream of the first and second high speed compressors.

In yet another refinement, the system includes an aftercooler in the common intake passage portion for cooling the charge flow from the first and second high pressure compressors. In another refinement, the common intake passage portion is connected to first and second intake manifold portions that are connected to respective first and second portions of the plurality of cylinders. In another refinement, the at least one low pressure turbocharger includes at least two low pressure turbochargers with respective first and second low pressure turbines connected to respective ones of the first and second exhaust passages.

In one refinement, the at least two low pressure turbochargers further include respective first and second low pressure compressors that are connected to respective ones of third and fourth intake passage portions. The compressed intake air from the first and second low pressure compressors combine in a second common intake passage portion and the fuel injector is connected to the second common intake passage portion to provide fuel to the compressed intake air. In another refinement, an intercooler is provided in the second common intake passage portion for cooling the intake air compressed by the first and second low pressure compressors.

In another refinement, the system includes a multi-stage bypass in the intake system configured to selectively bypass at least a portion of the charge flow from downstream of the high pressure compressor to upstream of the low pressure compressor. In a further refinement, the system includes a single stage bypass in the intake system configured to selectively bypass at least a portion of the charge flow from downstream of the high pressure compressor to an interstage location between the low pressure compressor and the high pressure compressor. In yet another refinement, a single stage bypass in the intake system is configured to selectively bypass at least a portion of the intake air from an interstage location between the low pressure compressor and the high pressure compressor to upstream of the low pressure compressor.

In another aspect, an internal combustion engine system includes an internal combustion engine and at least one intake system for delivering a charge flow to at least a portion of a plurality of cylinders of the internal combustion engine and at least one exhaust system for receiving exhaust gas from at least a portion of the plurality of cylinders. The system further includes at least one high-pressure turbocharger with a first high pressure turbine in the exhaust system and at least one low pressure turbocharger with a first low pressure turbine in the exhaust system downstream of the first high pressure turbine. The low pressure turbocharger further includes a first low pressure compressor operably connected to the low pressure turbine with the low pressure compressor situated in the intake system to receive and compress intake air. The high pressure turbocharger further includes a first high pressure compressor operably connected with the first high pressure turbine with the first high pressure compressor situated in the intake system downstream of the low pressure compressor. The system also includes a fuel injector connected to the intake system between the low pressure compressor and the high pressure compressor to provide a fuel to the intake air and form the charge flow for compression by the high pressure compressor. A multi-stage bypass is configured to selectively bypass at least a portion of the charge flow in the intake system from a first location that is downstream of the high pressure compressor to a second location that is upstream of the low pressure compressor.

In one refinement, the system includes a single stage bypass configured to selectively bypass charge flow in the intake system from the first location to an interstage location that is between the low pressure compressor and the high pressure compressor. In another refinement, the system includes a single stage bypass that is configured to selectively bypass inlet air in the intake system from an interstage location that is between the low pressure compressor and the high pressure compressor to upstream of the low pressure compressor. In yet another refinement, the system includes a wastegate connected to the exhaust system around the high pressure turbine.

According to another aspect, an internal combustion engine system includes an internal combustion engine having at least one intake system for delivering a charge flow to at least a portion of a plurality of cylinders of the internal combustion engine and at least one exhaust system for receiving exhaust gas from at least a portion of the plurality of cylinders. The system also includes a first high pressure turbocharger with a first high pressure turbine in a first exhaust passage of the exhaust system and a second high pressure turbocharger with a second high pressure turbine in a second exhaust passage of the exhaust system. The system further includes a first low pressure turbocharger with a first low pressure turbine situated in the first exhaust passage and a second low pressure turbocharger with a second low pressure turbine situated in the second exhaust passage. The first low pressure turbocharger further includes a first low pressure compressor in a first intake passage portion and the second low pressure turbocharger further includes a second low pressure compressor in a second intake passage portion of the intake system. The outlets of the first and second low pressure compressors are connected to a first common intake passage portion to provide compressed intake air thereto. A fuel injector is connected to the first common intake passage portion and is configured to provide a fuel to the intake air to form the charge flow. The first common intake passage branches to third and fourth intake passage portions downstream of the connection of the fuel injector. The first high pressure turbocharger further includes a first high pressure compressor in the third intake passage portion operably connected to the first high pressure turbine and the second high pressure turbocharger includes a second high pressure compressor in the fourth intake passage portion operably connected to the second high pressure turbine. The first and second high pressure compressors are each operable to compress the charge flow received from the respective third and fourth intake passage portions.

In one refinement of this aspect, the intake system includes a second common intake passage portion that receives the compressed charge flows from the first and second high pressure compressors upstream of the plurality of cylinders.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:
1. An internal combustion engine system, comprising:
an internal combustion engine including at least one intake system for delivering a charge flow to at least a portion of a plurality of cylinders of the internal combustion engine and at least one exhaust system for receiving exhaust gas from at least a portion of the plurality of cylinders;
at least one high-pressure turbocharger with a first high pressure turbine in the exhaust system and at least one low pressure turbocharger with a first low pressure turbine in the exhaust system downstream of the first high pressure turbine;

the low pressure turbocharger further including a first low pressure compressor operably connected to the low pressure turbine with the low pressure compressor in the intake system to receive and compress intake air, and the high pressure turbocharger further including a first high pressure compressor operably connected with the first high pressure turbine with the first high pressure compressor in the intake system downstream of the low pressure compressor;

an intercooler in the intake system passage between the low pressure compressor and the high pressure compressor for cooling the intake air compressed by the low pressure compressor; and a fuel injector connected to the intake system between the low pressure compressor and the high pressure compressor downstream of the intercooler, the fuel injector being operably connected to a pressurized fuel source to provide a pressurized gaseous fuel to the compressed intake air between the low pressure compressor and the high pressure compressor and form the charge flow for compression by the high pressure compressor, wherein the pressurized gaseous fuel is 30-40 pounds per square inch.

2. The system of claim 1, further comprising a wastegate connected to the exhaust system around the high pressure turbine.

3. The system of claim 1, further comprising an aftercooler in the intake system downstream of the high pressure compressor and upstream of an intake manifold of the internal combustion engine for cooling the charge flow compressed by the high pressure compressor.

4. The system of claim 1, further comprising a throttle in the intake system between the high pressure compressor and an intake manifold of the internal combustion engine to regulate the charge flow to the plurality of cylinders.

5. The system of claim 1, wherein the at least one high pressure turbocharger includes at least two high pressure turbochargers with respective first and second high pressure turbines connected to respective ones of first and second exhaust passages of the exhaust system.

6. The system of claim 5, wherein the at least two high pressure turbochargers further include respective first and second high pressure compressors that are connected to respective ones of first and second intake passage portions of the intake system, wherein the first and second intake passage portions connect to one another at a common intake passage portion downstream of the first and second high speed compressors.

7. The system of claim 6, further comprising an aftercooler in the common intake passage portion for cooling the charge flow from the first and second high pressure compressors.

8. The system of claim 6, wherein the common intake passage portion is connected to first and second intake manifold portions that are connected to respective first and second portions of the plurality of cylinders.

9. The system of claim 6, wherein the at least one low pressure turbocharger includes at least two low pressure turbochargers with respective first and second low pressure turbines connected to respective ones of the first and second exhaust passages.

10. The system of claim 9, wherein the at least two low pressure turbochargers further include respective first and second low pressure compressors connected to respective ones of third and fourth intake passage portions, wherein compressed intake air from the first and second low pressure compressors combine in a second common intake passage portion and the fuel injector is connected to the second common intake passage portion to provide fuel to the compressed intake air.

11. The system of claim 10, further comprising an intercooler in the second common intake passage portion for cooling the intake air compressed by the first and second low pressure compressors.

12. The system of claim 1, further comprising a multi-stage bypass in the intake system configured to selectively bypass at least a portion of the charge flow from downstream of the high pressure compressor to upstream of the low pressure compressor.

13. The system of claim 12, further comprising a single stage bypass in the intake system configured to selectively bypass at least a portion of the charge flow from downstream of the high pressure compressor to an interstage location between the low pressure compressor and the high pressure compressor.

14. The system of claim 12, further comprising a single stage bypass in the intake system configured to selectively bypass at least a portion of the intake air from an interstage location between the low pressure compressor and the high pressure compressor to upstream of the low pressure compressor.

15. The system of claim 1, wherein the pressurized gaseous fuel is one of natural gas, methane, or propane.

16. An internal combustion engine system, comprising:

an internal combustion engine including at least one intake system for delivering a charge flow to at least a portion of a plurality of cylinders of the internal combustion engine and at least one exhaust system for receiving exhaust gas from at least a portion of the plurality of cylinders;

at least one high-pressure turbocharger with a first high pressure turbine in the exhaust system and at least one low pressure turbocharger with a first low pressure turbine in the exhaust system downstream of the first high pressure turbine;

the low pressure turbocharger further including a first low pressure compressor operably connected to the low pressure turbine with the low pressure compressor connected in the intake system to receive and compress intake air, and the high pressure turbocharger further including a first high pressure compressor operably connected with the first high pressure turbine with the first high pressure compressor connected in the intake system downstream of the low pressure compressor;

a fuel injector connected to the intake system between the low pressure compressor and the high pressure compressor, wherein the fuel injector is operably connected to a pressurized fuel source to provide a pressurized gaseous fuel to the intake air between the low pressure compressor and the high pressure compressor and form the charge flow for compression by the high pressure compressor, wherein the pressurized gaseous fuel is 30-40 pounds per square inch; and a multi-stage bypass configured to selectively bypass at least a portion of the charge flow in the intake system from a first location that is downstream of the high pressure compressor to a second location that is upstream of the low pressure compressor.

17. The system of claim 16, further comprising a single stage bypass configured to selectively bypass charge flow in the intake system from the first location to an interstage location that is between the low pressure compressor and the high pressure compressor.

18. The system of claim 16, further comprising a single stage bypass that is configured to selectively bypass inlet air in the intake system from an interstage location that is between the low pressure compressor and the high pressure compressor to upstream of the low pressure compressor.

19. The system of claim 16, further comprising a wastegate connected to the exhaust system around the high pressure turbine.

20. The system of claim 16, further comprising an intercooler in the intake system passage between the low pressure compressor and the high pressure compressor for cooling the intake air compressed by the low pressure compressor and the fuel injector is connected to the intake system between the low pressure compressor and the high pressure compressor.

21. The system of claim 16, wherein the pressurized gaseous fuel is one of natural gas, methane, or propane.

* * * * *